(12) United States Patent
Johnson et al.

(10) Patent No.: US 7,853,828 B2
(45) Date of Patent: Dec. 14, 2010

(54) GRAPHICALLY EXTENSIBLE, HARDWARE INDEPENDENT METHOD TO INSPECT AND MODIFY STATE OF TEST EQUIPMENT

(75) Inventors: Jeffrey Johnson, San Jose, CA (US); Ben Rogel-Favila, Santa Clara, CA (US); Alan Davis, Mountain View, CA (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 1248 days.

(21) Appl. No.: 11/432,176

(22) Filed: May 11, 2006

(65) Prior Publication Data
US 2007/0266272 A1    Nov. 15, 2007

(51) Int. Cl.
*G06F 11/00* (2006.01)
(52) U.S. Cl. .............. 714/37; 714/25; 714/27; 714/39; 714/46
(58) Field of Classification Search .......... 714/25, 714/27, 32, 33, 37, 39, 46
See application file for complete search history.

(56) References Cited

U.S. PATENT DOCUMENTS

| | | | |
|---|---|---|---|
| 7,272,752 B2* | 9/2007 | Farchi et al. | 714/38 |
| 2004/0088405 A1* | 5/2004 | Aggarwal | 709/224 |
| 2004/0225465 A1* | 11/2004 | Pramanick et al. | 702/119 |
| 2005/0154550 A1* | 7/2005 | Singh et al. | 702/108 |
| 2006/0036390 A1* | 2/2006 | Loh et al. | 702/117 |
| 2006/0174161 A1* | 8/2006 | Sharma | 714/38 |
| 2008/0155329 A1* | 6/2008 | Kolman | 714/33 |

* cited by examiner

*Primary Examiner*—Robert Beausoliel
*Assistant Examiner*—Joseph D Manoskey
(74) *Attorney, Agent, or Firm*—Holland & Hart, LLP

(57) ABSTRACT

A hardware independent and graphically extensible tester state browsing technique for observing and modifying operating state of test equipment includes accessing a descriptor file describing an architecture of the test equipment, invoking a set of plugins associated with one or more subsystems of the test equipment, and displaying a map with a set of drill-down mechanisms each associated with different ones of the subsystems of the test equipment which invoke the respective plugin associated with its corresponding respective subsystem.

10 Claims, 6 Drawing Sheets

410 — <name subsystem>
420 — <editor editorApplication>
430 — <content contentProviderApplication>
440 — <label labelProviderApplication>

GRAPHICALLY EXTENSIBLE, HARDWARE INDEPENDENT METHOD TO INSPECT AND MODIFY STATE OF TEST EQUIPMENT

BACKGROUND OF THE INVENTION

The present invention relates to systems and methods for browsing the operating state of test equipment.

Modern industrial test equipment that tests objects of manufacture is typically automated to allow reliable high volume manufacturing. Keeping these testers up and running is therefore of paramount importance for meeting production goals. Inherent in keeping a tester up and running is the ability to quickly and efficiently observe and configure the operating state of the tester. Such test equipment typically provides some type of user interface to allow configuration of the tester and observation of its operational state. However, the user interface typically comprises customized software specific to the particular test equipment. In addition, the user interface is typically dependent on the hardware of the particular test equipment.

For example, semiconductor manufacturing facilities may utilize Automated Test Equipment (ATE) for testing integrated circuit devices. In the past, state data of the ATE was examined using a text-based interface and a set of commands for display and modification of the state data. Graphical state data display for ATE in the past was tied to the hardware, operating merely as a graphical user interface that calls the text-based commands. This type of GUI is static, either drawn at run-time from polygons, or pre-rendered. Furthermore, the mapping of GUI elements to command calls to the hardware to obtain/modify state data is also static.

In addition, in the past, the state information returned by the test equipment is often not regular, and specialized parsers are often required for different types of command calls.

It would therefore be desirable to have a hardware independent and graphically extensible interface to test equipment that allows inspection, and preferably modification, of the operational state of test equipment.

SUMMARY OF THE INVENTION

Embodiments of the invention include methods and apparatus for browsing test equipment.

In one embodiment, a tester state browser includes a set of plugins associated with one or more subsystems of the test equipment, a descriptor file describing an architecture of the test equipment and designating one or more of the set of plugins to corresponding one or more of the subsystems of the test equipment, and a navigation module that reads the descriptor file, displays a map of the architecture of the test equipment based on the architecture described in the descriptor file, displays in the map a set of drill-down mechanisms each associated with different ones of the subsystems of the test equipment wherein each drill-down mechanism invokes the plugin associated with its corresponding respective subsystem.

In one embodiment, a method comprises reading a descriptor file associated with an architecture of a tester, the descriptor file comprising a description of one or more subsystems of the architecture of the tester, wherein at least one of the descriptions associated with a given subsystem identifies an editor application for use in displaying information associated with the given subsystem and a content provider application for use in retrieving data from the give subsystem; displaying a map including a representation of each of the one or more subsystems described in the descriptor file; and providing a drill-down mechanism for each of the subsystems of the test equipment named in the descriptor file that include an associated editor application and content provider application, the drill-down mechanism invoking the associated editor application and content provider application when activated.

In one embodiment, a system comprises a tester comprising a plurality of subsystems; a plurality of plugins associated with the respective plurality of subsystems, each plugin comprising an editor application for use in displaying data from its associated subsystem and a content provider application for use in retrieving data from its associated subsystem; a descriptor file associating the plugins with the subsystems; and a tester state browser which reads the descriptor file, displays a map illustrating the plurality of subsystems of the tester, and provides respective drill-down mechanisms associated with each of the subsystems to invoke the corresponding plugin associated with the respective subsystems when activated.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural logical and electrical changes may be made without departing from the spirit and scope of the present inventions. The following detailed description is, therefore, not to be taken in a limiting sense, and the scope of the present inventions is defined only by the appended claims.

Embodiments of the invention presented herein describe hardware independent and graphically extensible interface methods and devices that allow inspection and modification of an operating state of test equipment.

Figure 1:
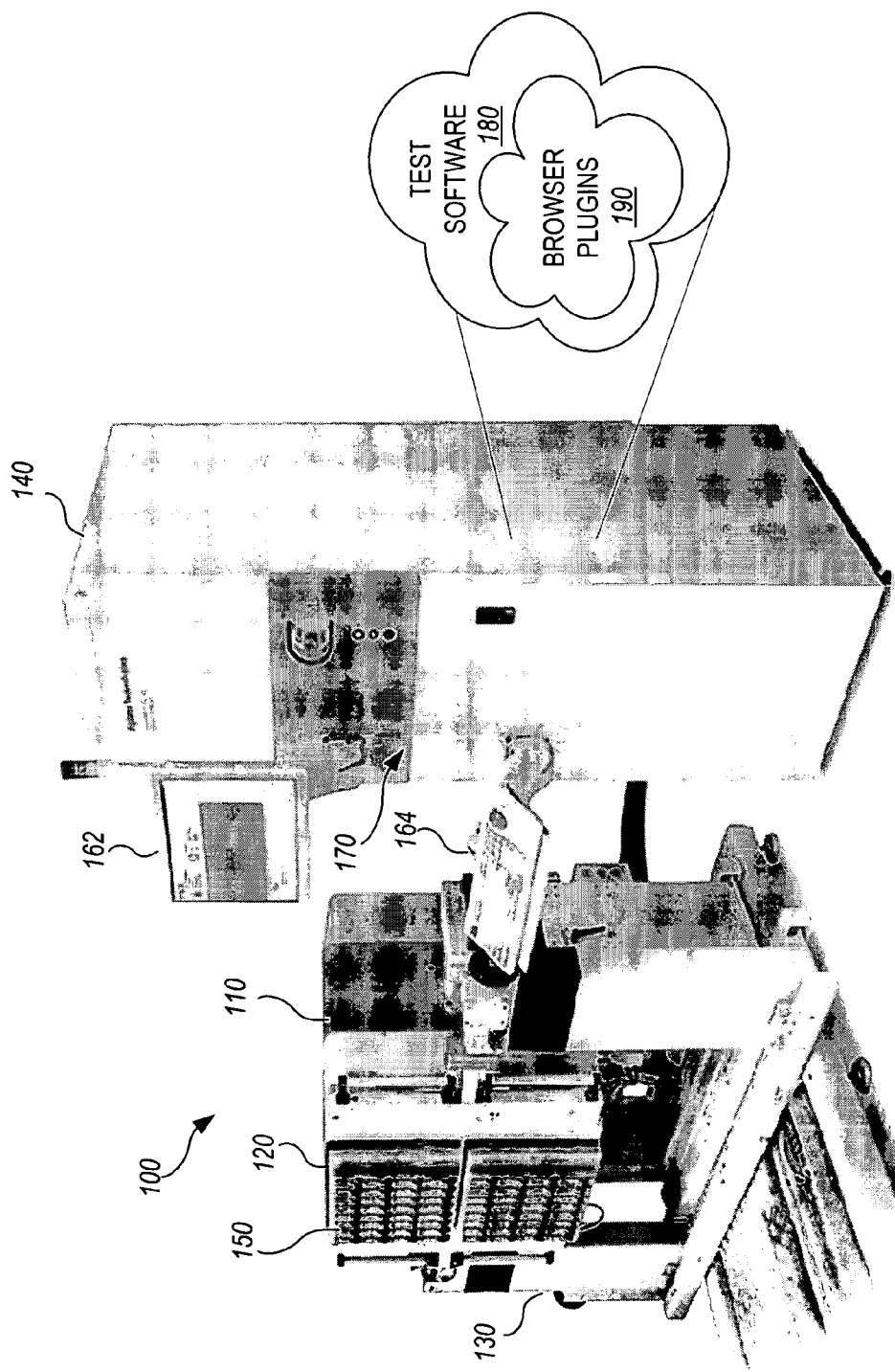
FIG. 1 is a perspective view of a tester that may be browsed by a tester state browser of the invention.

FIG. 1 illustrates an exemplary embodiment of test equipment 100, specifically an Agilent Versatest V5x00 (manufactured by Agilent Technologies, Inc. of Palo Alto, Calif.). As illustrated, the test equipment 100 comprises test head 110 with DUT (Device under test) interface 120, a manipulator 130 for positioning test head 110, DUT board 150 which plugs into underlying DUT interface 120, support rack 140 for supplying test head 110 with electrical power, cooling water and compressed air (not shown in the Figures).

Test head 110 comprises tester electronics including pin electronics (PE), programmable power supplies (PPS), algorithmic pattern generators (APG) and additional analog modules. Test head 110 is configured with a number of pins, for example 4096 pins. The test head supports a number of card cages, for example 36 card cages. Each card cage supports digital boards or analog modules. The DUT is mounted on DUT board 150, which is connected to the I/O channels by DUT interface 120. DUT interface 120 consists of high performance coax cabling and spring contact pins (pogo pins) which establish electrical connection with DUT board 120.

General-purpose manipulator 130 supports and positions test head 110, providing precise and repeatable connections between test head 100 and handlers or wafer probers.

Support rack 140 is attached to manipulator 130 and serves as the interface between test head 110 and AC power, cooling, and compressed air.

The tester 100 may include a display 162, a keyboard 164, and a mouse (not shown), which may serve as the interface between the user and tester 100. Other input and output devices (not shown) may also be communicatively connected to the tester 100.

Test software may execute on a computer or workstation 170 to allow a user to configure and set up tests, and observe test status and test data downloaded from the test system. In one embodiment, as shown, the computer 170 is integrated into the tester 100 itself. In other embodiments, the computer 170 may be in remote communication with the tester 100. Testing is carried out in the tester 100. Results are retrieved by test software 180 running on the computer 170 and displayed on the monitor 162.

Figure 2:
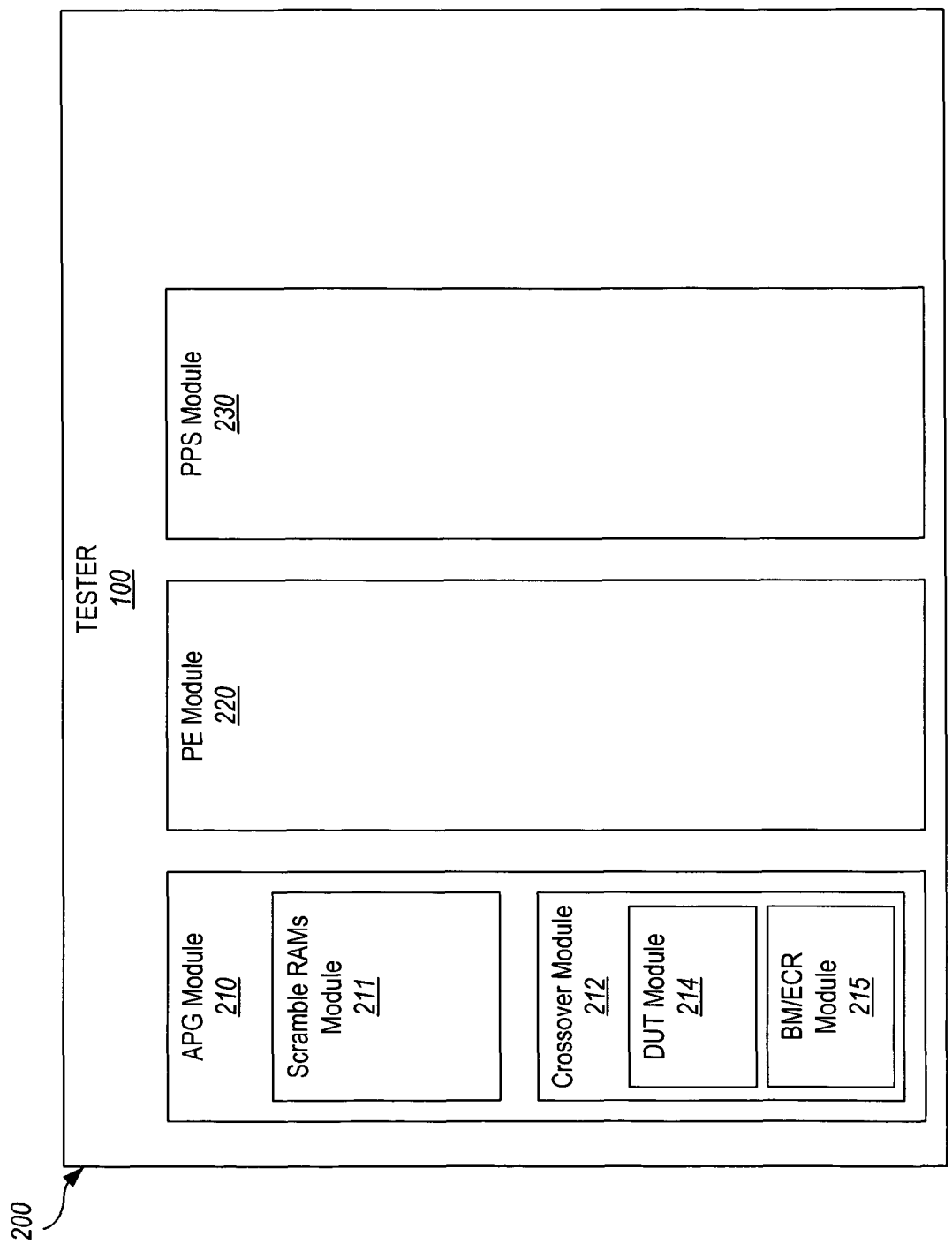
FIG. 2 is an architectural block diagram of an exemplary embodiment of the tester of FIG. 1.

FIG. 2 is an architectural block diagram illustrating the architecture 200 of a semiconductor device tester 100. As shown, the architecture 200 of the semiconductor device tester 100 includes an Algorithmic Pattern Generator (APG) module 210, a Pin Electronics (PE) module 220, and a Programmable Power Supply (PPS) module 230. The APG module 210 is a hardware and/or software module that generates vectors, typically used as test patterns for application to a device under test (DUT) during test. The PE module 220 is the hardware module that generally includes the drive and measurement channels corresponding to each of the tester interface pins. For example, a pin electronics channel may include any one or more of a driver circuit that generates a signal on a tester interface pin corresponding to the channel, one or more comparator circuits to measure signals received on the tester interface pin, a preprogrammed load circuit that forces a voltage-dependent current to be drawn from or pushed into the DUT pin, and a parametric measurement unit which can be programmed to apply a specific current and measure the resulting voltage or alternatively to apply a specific voltage and measure the resulting current. The PPS module 230 may be a hardware module that generates power and is programmable to allow variable voltage and frequency levels.

The major systems may include subsystems. For example, the APG module has further sub-systems including a Scramble RAM module 111 and a Crossover module 112, the details of which are beyond the scope of the present invention. It is sufficient to say that each of the Scramble RAM module 111 and Crossover module 112 implement separate tester functionality that may be observable and preferably modifiable (e.g., through changing contents of registers, data input, etc). For example, the Crossover module 112 is hardware that handles the selection of the data path between the modules (such as the APG) and the tester interface pins.

Sub-systems may include further sub-systems. For example, the Crossovers 112 of the APG module 110 may include further sub-systems including a Device under test (DUT) Crossover 114 and a Bit Map (BM)/Error Check RAM (ECR) Crossover 115. Again, the details of the particular functionality of the subsystems are beyond the scope of the present invention, and it is sufficient to say that each of the sub-systems implement separate tester functionality that may be observable and preferably modifiable (e.g., through changing contents of registers, data input, etc).

Figure 3:
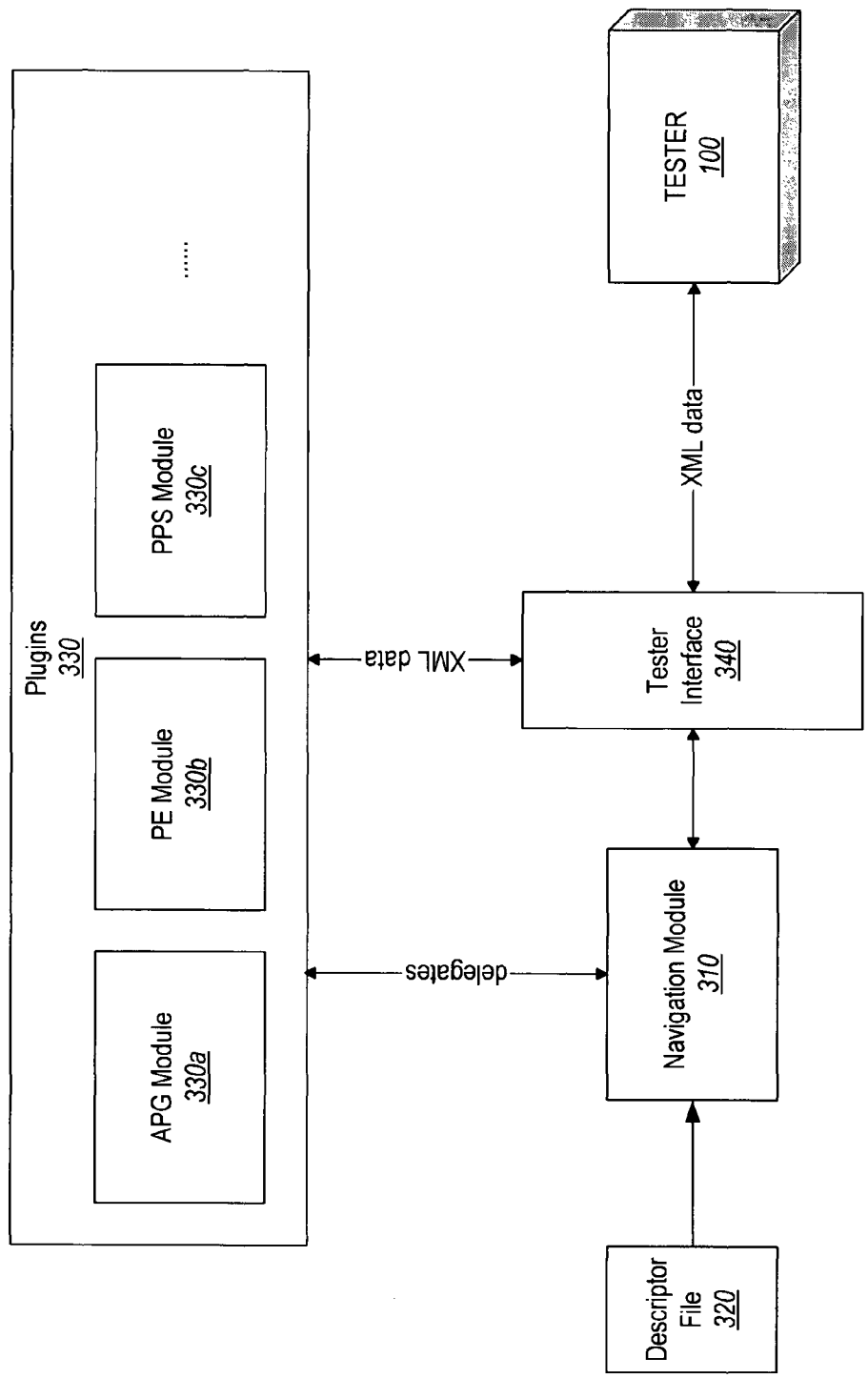
FIG. 3 is a functional block diagram illustrating functional logic of a tester state browser in accordance with an embodiment of the invention.

An embodiment of a tester state browser may interface with a tester (such as that 100 shown in FIGS. 1 and 2) with any number of major systems, and any number and levels of sub-systems. The architecture of an embodiment of a tester state browser 300 is shown in FIG. 3. As illustrated, the tester state browser 300 includes a navigation module 310. The navigation module 310 determines the architecture 200 of the particular test equipment 100. In one embodiment, the navigation module 310 queries the test equipment that it will interface with to determine the architecture of the particular test equipment. In an alternative embodiment, the navigation module 310 is passed a parameter (for example, from a user) identifying the architecture of the test equipment that it will browse.

Once the architecture of the test equipment is determined, the navigation module 310 then reads a descriptor file 320 associated with the architecture of the test equipment that the browser 300 is to interface with. The descriptor file 320 describes a set of plugins 330, each associated with one or more systems or subsystems of the particular architecture. In one embodiment, the descriptor file 320 is written in a hardware independent language such as XML.

The descriptor file 320 contains a description of one or more subsystems of the test equipment architecture. A description of a given subsystem of the test equipment architecture may include, for example as shown in FIG. 4, the name 410 of the subsystem, the name and path 420 of an editor application to used when displaying information associated with the named subsystem, the name and path 430 of a content provider application to be used to obtain information from the named subsystem for display, and the name and path 440 of a label provider application to be used to appropriately parse and label the information received from the content provider for displaying the information received from the content provider.

The editor, content provider and label provider applications associated with a subsystem as described in the descriptor file 320 are preferably contained in respective plugins 330 associated with the particular subsytem. Referring back to FIG. 3, the plugins 330 include an APG module plugin 330a, a PE module plugin 330b, and a PPS module plugin 330c.

Figures 4, 5:
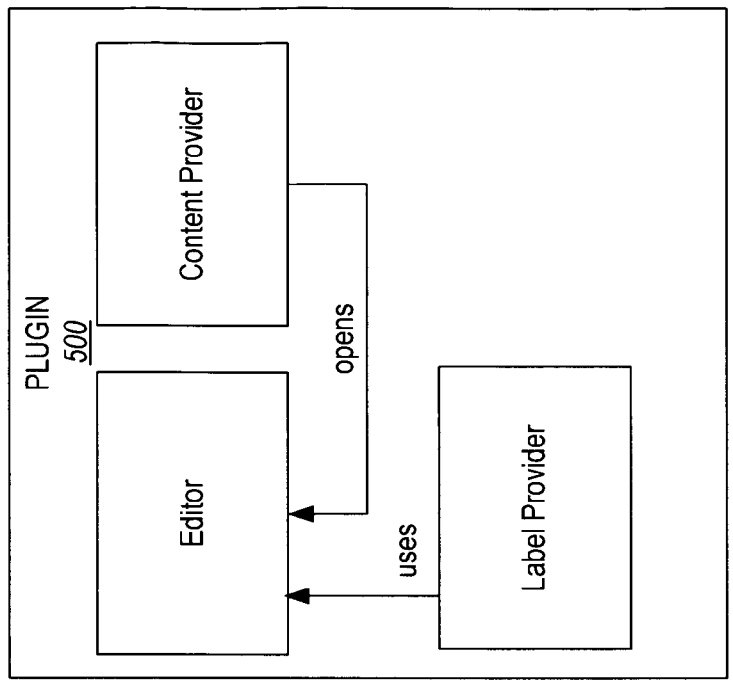
FIG. 4 is diagram illustrating example content of a description which may be employed in a descriptor file.
FIG. 5 is a functional block diagram of an exemplary plugin.

FIG. 5 illustrates the contents of a typical plugin 500. As illustrated, a plugin 500 generally includes an editor application 510, a content provider application 520, and a label provider application 530, each used to respectively edit, retrieve content, and present data for the particular subsystem of the test equipment that the plugin is associated with.

Figure 6:
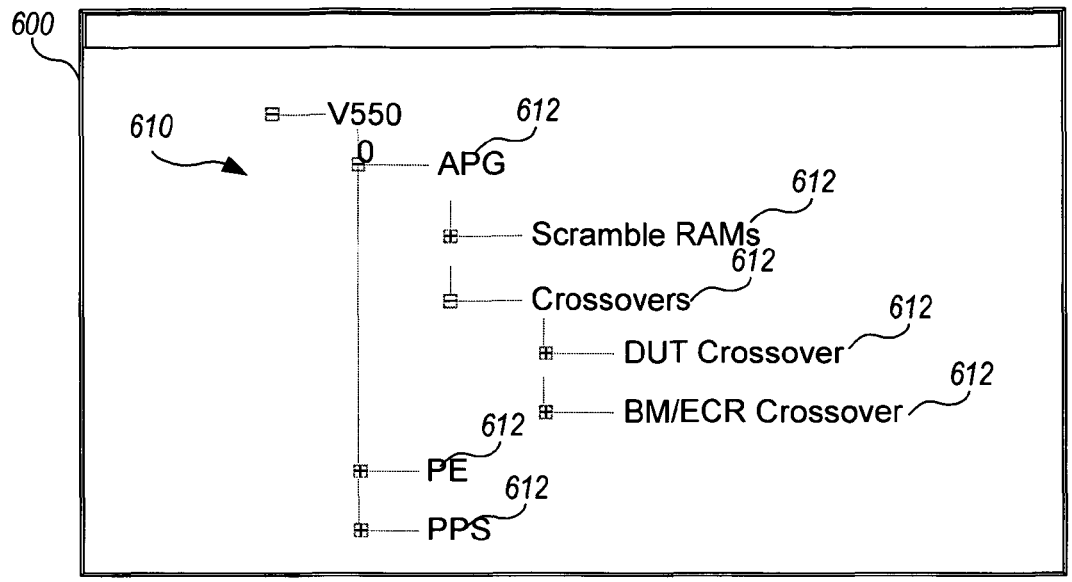
FIG. 6 is a graphical window for a display illustrating a tree map.
Figure 7:
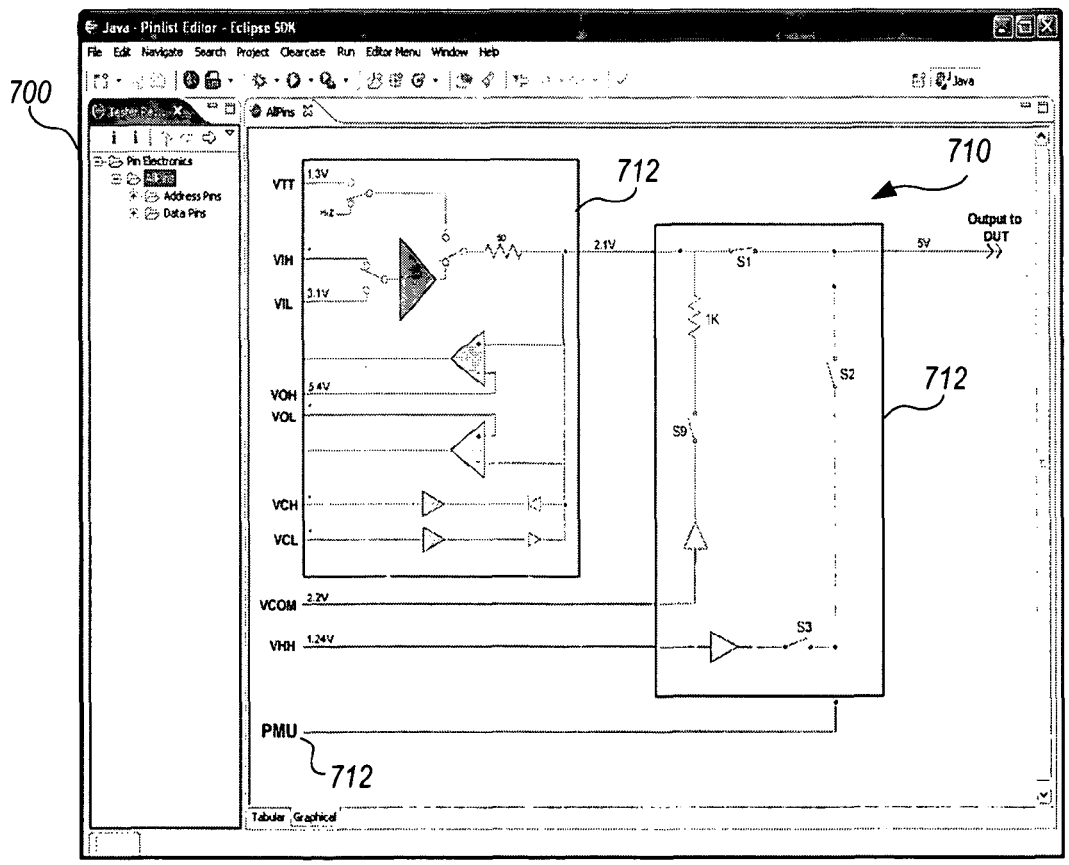
FIG. 7 is a graphical window for a display illustrating a block diagram map.

Again referring to FIG. 3, the navigation module 310 of the tester state browser 300 displays a map of the architecture of the test equipment on a display. In one embodiment, the map is in the form of a tree 610, such as that displayed in a window 600 of a display screen as shown in FIG. 6 corresponding to the architecture 200 (FIG. 2) of the semiconductor device tester 100 (FIG. 1). In an alternative embodiment, the map is in the form of a block diagram 710, such as that displayed in a window 700 of a display screen as shown in FIG. 7 corresponding to the architecture 200 (FIG. 2) of the semiconductor device tester 100 (FIG. 1).

Within the map of the test equipment on the display, the navigation module 310 displays at least one drill-down mechanism associated with at least one respective system or sub-system of the test equipment architecture. In one embodiment, the drill-down mechanism is a hyperlink that is activated by clicking on the hyperlink using a mouse or assigned keyboard strokes. For example, in the tree 610 of FIG. 6, nodes of the tree that correspond to subsystems of the test equipment 100 may be hyperlinks 612. In another example, signals and/or components in the block diagram 710 that correspond to subsystems of the test equipment 100 may be hyperlinks 712.

Figure 8:
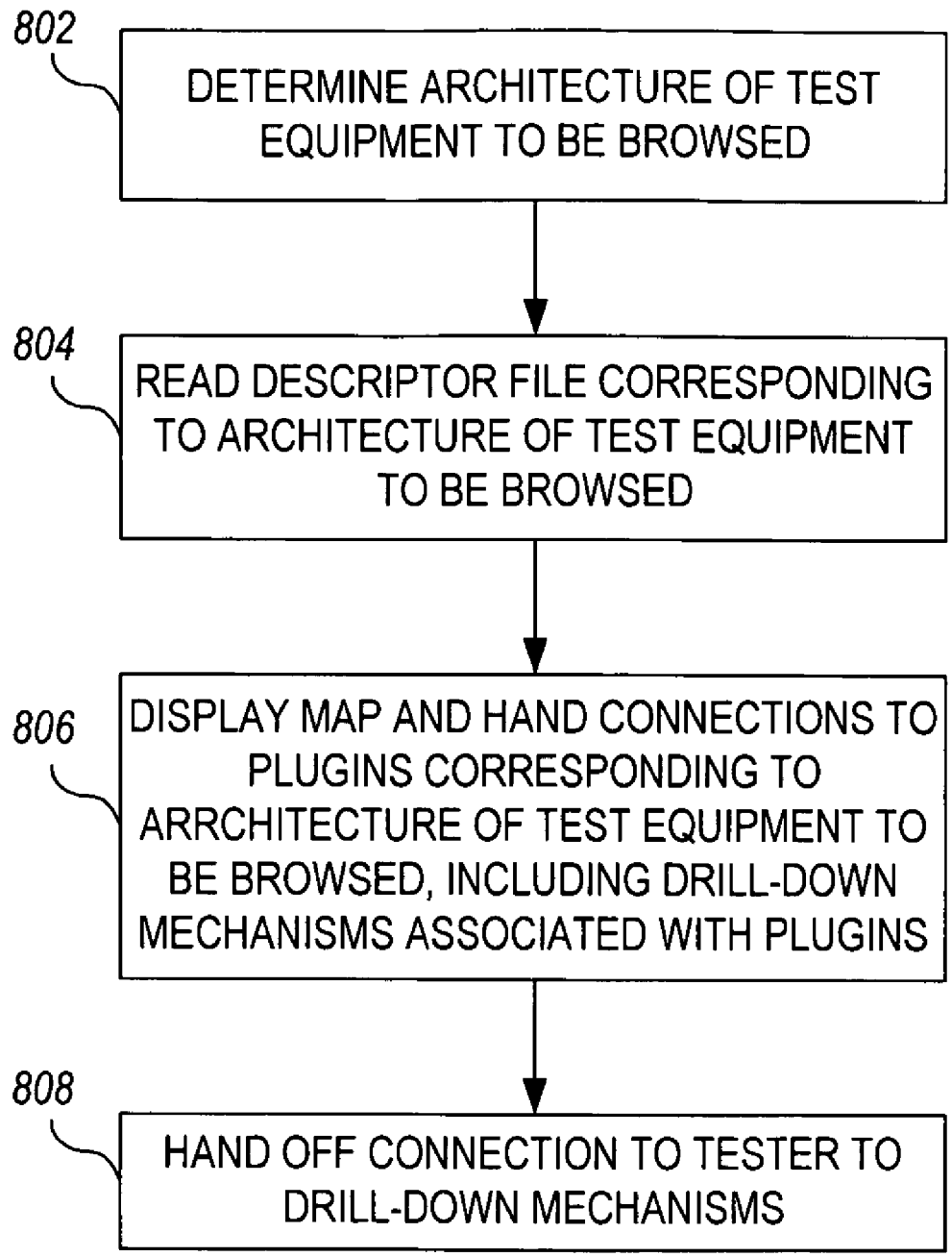
FIG. 8 is a flowchart illustrating an embodiment of a method in accordance with the invention.

FIG. 8 illustrates a flow of operation of an embodiment of the tester state browser 300. The tester state browser 300 begins in a step 802 by determining the architecture of the test equipment being browsed. The tester state browser 300 reads a descriptor file corresponding to the architecture of the test equipment to be browsed in a step 804. The tester state browser 300 then displays a map representing the architecture of the test equipment being browsed in a step 806, including presenting drill-down mechanisms for at least one subsystem, component, or signal for which additional browsing is available. The tester state browser 300 then hands off connection of the drill-down mechanisms to associated plugins in a step 808.

For example, when the tester state browser 300 of FIG. 3 is first invoked, it may begin by invoking the navigation module 310. The navigation module 310 may query the test equipment 100 to determine the particular architecture of the test equipment 100. Knowing the architecture of the particular test equipment 100, the navigation module 310 may then read the descriptor file 320 corresponding to the test equipment architecture. Based on the contents of the descriptor file 320, the navigation module 310 may display a map of the test equipment architecture on a screen. The map includes drill-down mechanisms for systems and sub-systems for which additional data or lower-level maps exist. The drill-down mechanisms may each be mapped to a corresponding plugin as designated in the descriptor file 320 corresponding to the particular test equipment architecture. There may be one plugin for each subsystem. For example, for the architecture 200 shown in FIG. 2 of semiconductor device tester 100 of FIG. 1, there may be separate plugins 330*a*, 330*b*, 330*c* for each of the APG 210, PE 220, and PPS 230 modules. In order to be "generic" the navigation module 310 delegates its work (displaying tree items under subsystems—e.g. "Scramble RAMs" and "Crossovers" under APG) to the separate plugins 330*a*, 330*b*, 330*c*. Once the drill-down mechanisms are displayed in the map corresponding to the architecture 200 of the test equipment 100, the navigation module 310 then detects input from the user and forwards the input events to the appropriate plugin.

For example, the descriptor file 320 may be an XML file that describes each of the subsystems and their corresponding plugins for the given architecture. Below is an example XML file, entitled Versatest.xml for the Agilent Versatest ATE family:

```
Versatest.xml
<?xml version="1.0" encoding="UTF-8"?>
<architecture name="v5x00">
    <subcomponent name="APG">
        <editor class="com.agilent.sts.tsb.editors.V5X00APGEditor"/>
        <view>
            <contentProvider
class="com.agilent.sts.tsb.views.V5X00APGContentProvider"/>
            <labelProvider
class="com.agilent.sts.tsb.views.V5X00APGLabelProvider"/>
        </view>
    </subcomponent>
    <subcomponent name="PE">
        <editor class="com.agilent.sts.tsb.editors.V5X00PinlistEditor"/>
        <view>
            <contentProvider
class="com.agilent.sts.tsb.views.V5X00PinContentProvider"/>
            <labelProvider
class="com.agilent.sts.tsb.views.V5X00PinLabelProvider"/>
        </view>
    </subcomponent>
</architecture>
<architecture name="v4x00">
    <subcomponent name="APG">
        <editor class="com.agilent.sts.tsb.editors.V4X00APGEditor"/>
        <view>
            <contentProvider
class="com.agilent.sts.tsb.views.V4X00APGContentProvider"/>
            <labelProvider
class="com.agilent.sts.tsb.views.V4X00APGLabelProvider"/>
        </view>
    </subcomponent>
    <subcomponent name="PE">
        <editor class="com.agilent.sts.tsb.editors.V4X00PinlistEditor"/>
        <view>
            <contentProvider
class="com.agilent.sts.tsb.views.V4X00PinContentProvider"/>
            <labelProvider
class="com.agilent.sts.tsb.views.V4X00PinLabelProvider"/>
        </view>
    </subcomponent>
</architecture>
```

A key to the Versatest.xml file describing the contents is shown in TABLE 1.

TABLE 1

| Element | Attribute | Description |
|---|---|---|
| Architecture | ID | Name of type of architecture |
| Subcomponent | ID | Name of subcomponent of system |
| Editor | value | Name of editor application |
| Content Provider | value | Name of content provider application |
| Label Provider | value | Name of label provider application |

In operation, the navigation module 310 reads the Versatest.xml file and instantiates the objects corresponding to the particular tester to be browsed (e.g., the V5500) as the file is being parsed. Once all the objects are created, the navigation module 310 then hands off the connection that it has with the V5500 ATE system (via Interface class 340) to the different plugins 330*a*, 330*b*, 330*c* so that the plugins 330*a*, 330*b*, 330*c* can populate the navigation tree 610 under their root item as shown in FIG. 6. For example, when the navigation module 310 reads in the XML descriptor file Versatest.xml, it will first parse the APG subsystem component. Thus, the navigation module 310 will then create an APG item in the tree 610 as follows:

```
+ V5500
----- + APG
```

The navigation module 310 may then hand off the connection that it has to the tester 100 through the tester interface 340 to the APG plugin 330a. The APG plugin 330a may then use the connection to the ATE hardware and retrieve the necessary data associated with the APG subsystem. Once APG plugin 330a has successfully received the data, the APG plugin 330a may populate its tree item with any items that belong to the APG subcomponent (in this case the Scramble RAM module 211 and Crossover module 212). The resulting navigation tree will then look as follows:

```
+ System
------ + APG
----------- + Scramble Rams
----------- + Crossover
---------------- + DUT Crossover
---------------- + BM/ECR Crossover
```

The navigation module continues to similarly parse the Versatest.xml file and hand off the connections to the remaining plugins to result in the final tree 610 shown in FIG. 6.

When the user clicks on a hyperlinked tree item 612, the navigation module 310 may instantiate an editor object (corresponding to the editor application specified in the XML descriptor file 320) that displays the main window that is associated with that subcomponent (in this case, the APG subcomponent). For example, if the user clicks on the "DUT Crossover"hyperlink 612a, the navigation module will recognize that item belongs to the APG subsystem 210, instantiate the class:

com.agilent.sts.tsb.editors.V5X00APGEditor (assuming a v5x00 architecture) and pass in the value "DUT Crossover" so the plugin 330a will know how to display the data associated with the APG subsystem properly.

Referring back to FIG. 7, the window 700 illustrates an embodiment of a tester state browser 300 in action. A navigation tree may be displayed in a the window 720 (only showing one system at the current time) and the editor may be displayed in a window 730.

In an alternative embodiment, the navigation may be integrated into the editor. For example, in FIG. 7, hyperlinks may be implemented within the editor window 730 to allow a user to dive down into lower level detail. For example, the PMU signal may be provided with a hyperlink within the editor window 730. If a user clicks on the "PMU" hyperlink, the editor displays a lower level diagram associated with the PMU signal.

What is claimed is:

1. A computer workstation having functional logic thereon, the functional logic defining a tester state browser for interfacing with test equipment, the tester browser comprising:
    a set of plugins associated with one or more subsystems of the test equipment, the set of plugins indicating how to obtain, display and edit information for the one or more subsystems of the test equipment;
    a descriptor file describing an architecture of the test equipment and designating one or more of the set of plugins to corresponding one or more of the subsystems of the test equipment;
    a navigation module that determines the architecture of the test equipment, reads the descriptor file to identify ones of the set of plugins and determine how to display a map of the architecture of the test equipment, and displays in the map a set of drill-down mechanisms each associated with different ones of the subsystems of the test equipment, wherein each drill-down mechanism invokes the plugin associated with its corresponding respective subsystem.

2. The computer workstation of claim 1, wherein the descriptor file comprises an XML file.

3. The computer workstation of claim 1, wherein the descriptor file comprises a description of one or more subsystems of the test equipment to display in the map.

4. The computer workstation of claim 3, wherein the description comprises an editor application associated with a corresponding subsystem for use in displaying information associated with the corresponding subsystem.

5. The computer workstation of claim 3, wherein the description comprises a content provider application associated with a corresponding subsystem for use in obtaining data content from the corresponding subsystem.

6. A method comprising:
    determining an architecture of a tester;
    reading a descriptor file associated with the architecture of the tester, the descriptor file generated independently of the determined architecture of the tester, and the descriptor file comprising a description of one or more subsystems of the architecture of the tester, wherein at least one of the descriptions associated with a given subsystem identifies an editor application for use in displaying information associated with the given subsystem and a content provider application for use in retrieving data from the give subsystem;
    displaying a map including a representation of each of the one or more subsystems described in the descriptor file; and
    providing a drill-down mechanism for each of the subsystems of the test equipment named in the descriptor file that include an associated editor application and content provider application, the drill-down mechanism invoking the associated editor application and content provider application when activated.

7. The method of claim 6, further comprising:
    associating at least one subsystem of the test equipment with a respective plugin, the plugin comprising the associated editor application and content provider application associated with the respective subsystem; and
    handing off connection between the drill-down mechanism and the tester to the plugin associated with the subsystem.

8. A system comprising:
    a tester comprising a plurality of subsystems;
    a plurality of plugins associated with the respective plurality of subsystems, each plugin comprising an editor application for use in displaying data from its associated subsystem and a content provider application for use in retrieving data from its associated subsystem;
    a descriptor file associating the plugins with the subsystems;
    a tester state browser which determines the architecture of the tester, reads the descriptor file to identify ones of the set of plugins and determine how to display a map illustrating the plurality of subsystems of the tester, and provides respective drill-down mechanisms associated with each of the subsystems to invoke the corresponding plugin associated with the respective subsystems when activated.

9. A system comprising:

means for determining an architecture of a tester;

means for reading a descriptor file associated with the architecture of the tester, the descriptor file generated independently of the determined architecture of the tester, and the descriptor file comprising a description of one or more subsystems of the architecture of the tester, wherein at least one of the descriptions associated with a given subsystem identifies an editor application for use in displaying information associated with the given subsystem and a content provider application for use in retrieving data from the give subsystem;

means for displaying a map including a representation of each of the one or more subsystems described in the descriptor file; and means for providing a drill-down mechanism for each of the subsystems of the test equipment named in the descriptor file that include an associated editor application and content provider application, the drill-down mechanism invoking the associated editor application and content provider application when activated.

10. The system of claim 9, further comprising:

means for associating at least one subsystem of the test equipment with a respective plugin, the plugin comprising the associated editor application and content provider application associated with the respective subsystem; and means for handing off connection between the drill-down mechanism and the tester to the plugin associated with the subsystem.

* * * * *